L. F. WARD.
Corn Planter.
No. 18,999.
Patented Dec. 29, 1857.
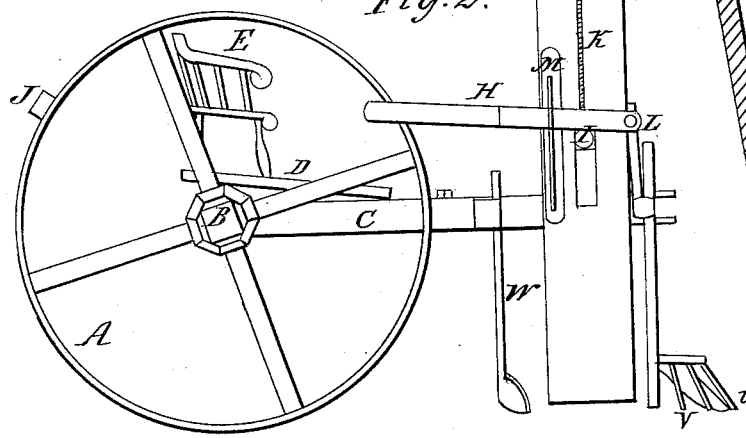
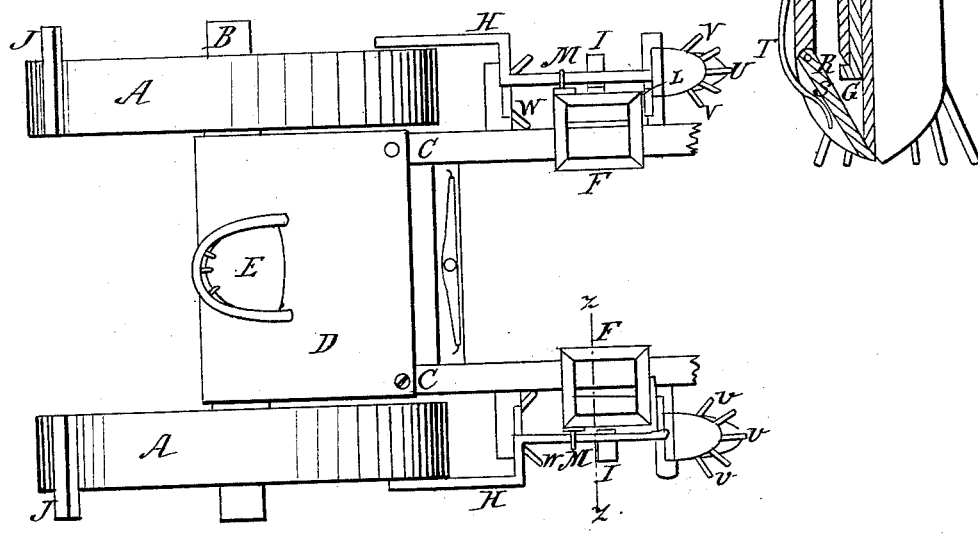

UNITED STATES PATENT OFFICE.

L. F. WARD, OF MARATHON, NEW YORK.

IMPROVEMENT IN SEED-PLANTERS.

Specification forming part of Letters Patent No. 18,999, dated December 29, 1857.

*To all whom it may concern:*

Be it known that I, L. F. WARD, of Marathon, in the county of Cortland and State of New York, have invented certain new and useful Improvements in Seed-Planters; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view of a machine with my improvements. Fig. 2 is a side elevation of the same. Fig. 3 is a sectional elevation of the seed-box on the line $z\ z$, Fig. 1.

The nature of my invention consists in a combination of devices arranged to operate the plunger, which delivers and deposits the seed automatically.

In the accompanying drawings, A A are the wheels fastened to the axle B, which is fitted to turn freely in the ends of the shaft C C, between which an animal may be harnessed in some convenient manner to draw the machine and operate it. These shafts C C are represented as broken off in the drawings. The floor D is fastened to the shafts or thills C C, and has a seat, E, arranged upon it for the driver, as shown in the drawings. The seed-boxes F F may be made in the form represented, or in such other form as will answer the purpose, and fastened to the shafts C C in the position shown—that is, before the wheels—so that the wheels will roll the earth and press it around the seed after it is deposited in the ground by the plunger G, arranged to traverse in the seed-box, and forced down by lever H acting on the pin I in the plunger, which lever H is depressed by the marking-cog J on the wheel A, which wheel may be made of such a size and provided with such a number of marking-cogs as will depress the lever and plunger as often as it is necessary to deposit the seed the required distance apart in the rows. The plunger and lever are drawn up by the spiral spring K, fastened to the pin I and the top of the seed-box for that purpose. The fulcrum of the lever H is fastened in the standard L, and it vibrates in the bracket M, which extends up so high on the side of the seed-box as to allow the lever to be raised and let the marking-cogs pass in backing the machine, and as the lever H simply lies on the pin I the plunger is not moved by the lever in backing the machine.

The construction of the seed-box is shown in Fig. 3, where it is represented in section, N N' being the outsides, G the plunger, and Q the partition separating the upper part of the plunger G from the seed and forming a recess for the upper part of the plunger to traverse in when operated as heretofore described. The lower end of the plunger has the cleat R fastened to it, and the plunger is drawn up just far enough to let a proper quantity of seed pass between the cleat R and the hinged flap S to plant one hill, the springs T closing the flap S against the opposite side of the box, so as to prevent the seed from escaping until it is forced out by the descent of the plunger and into the ground at the point where the hill is to be planted, and leave the required deposit of seed in the ground, when the earth will close over it and be pressed upon it by the wheel as it rolls along in its course. The furrowing-tooth U is connected to the shaft in front of the seed-box, and may be made in the form represented, or in such other form as will answer the purpose, and arranged so as to make a furrow in front or before the lower end of the seed-box, the prongs V V in front of the furrowing-tooth being designed to remove sods, clods, and other matter from before the tooth, and to move them beyond the reach of the wings of the scraper W, which is made to scrape the earth from each side of the furrow and draw it over the seed just before the wheel, which rolls the earth so drawn over and presses it upon the seed. The shank of the scraper W is connected to the shaft C behind the seed-box, as shown in the drawings.

The devices which operate the plunger may be so arranged as to deposit the seed where the marking-cogs mark the ground, or right between the marks, and if so arranged the machine may be marked, so that the marks made by the marking-cogs will come opposite to each other and form rows at right angles to the tracks of the wheels, so that the crop may be cultivated in two directions, one at a right angle to the other, and to make the rows equidistant there may be some rods inserted in the ends of the axle, and a chain or drag attached the same distance from the wheels that the wheels are apart, so as to mark the ground for the return of the wheel in planting the next row. This machine may be constructed to plant more than two rows at once, if desired.

I believe I have described and represented my improvements so as to enable any person skilled in the art to make and use it.

I will now state what I desire to secure by Letters Patent, to wit:

The combination of devices for operating the plunger to deposit the seed automatically, consisting of the marking-cogs J, the lever H, pin I, and spring K, constructed and arranged substantially as described.

L. F. WARD.

Witnesses:
 I. COMSTOCK,
 ELI B. HUSTED.